Dec. 21, 1954  L. A. DAUNCEY ET AL  2,697,308
APPARATUS FOR MANUFACTURING SYNTHETIC JEWELS
Filed July 15, 1952  3 Sheets-Sheet 1

INVENTORS
LEONARD ARTHUR DAUNCEY
DONALD GEORGE TIMMS
BY
ATTORNEY

Dec. 21, 1954  L. A. DAUNCEY ET AL  2,697,308
APPARATUS FOR MANUFACTURING SYNTHETIC JEWELS
Filed July 15, 1952  3 Sheets-Sheet 2

INVENTORS
LEONARD ARTHUR DAUNCEY
DONALD GEORGE TIMMS

ATTORNEY

Dec. 21, 1954 L. A. DAUNCEY ET AL 2,697,308
APPARATUS FOR MANUFACTURING SYNTHETIC JEWELS
Filed July 15, 1952 3 Sheets-Sheet 3

INVENTORS
LEONARD ARTHUR DAUNCEY
DONALD GEORGE TIMMS
BY
ATTORNEY

United States Patent Office 2,697,308
Patented Dec. 21, 1954

2,697,308

APPARATUS FOR MANUFACTURING SYNTHETIC JEWELS

Leonard Arthur Dauncey, London, and Donald George Timms, Northolt Park, England, assignors to The General Electric Company Limited, London, England Application July 15, 1952, Serial No. 299,034

Claims priority, application Great Britain June 6, 1952

3 Claims. (Cl. 49—53)

This invention is concerned with apparatus for manufacturing synthetic jewels, and is an improvement and/or modification of the invention forming the subject of co-pending patent application No. 297,707, filed July 8, 1952.

In patent application No. 297,707 there is described apparatus for manufacturing synthetic jewels comprising in combination means for passing through a primary duct a stream of gas carrying the constituent material of the jewels in powder form, a distributor for splitting up the stream of gas issuing from the primary duct so that it passes through at least two secondary ducts leading into a furnace chamber, the mean rates of flow of the gas and the powder through the secondary ducts being substantially the same for all the secondary ducts, means for fusing the constituent material issuing from the secondary ducts in the furnace chamber by a combustion process involving the gas issuing from the secondary ducts, a support member on which can be built up by progressive crystallisation of the molten constituent material a number (equal to the number of secondary ducts) of jewels in the form of rods which extend substantially vertically, and means for causing relative vertical movement between the support member and the openings of the secondary ducts into the furnace chamber as the rods are built up so as to maintain a substantially constant distance between the tips of the rods and the openings of the secondary ducts into the furnace chamber.

It is an object of the present invention to provide apparatus similar to that described in patent application No. 297,707 in which greater uniformity in the synthetic jewels produced may be obtained.

According to the present invention, apparatus for manufacturing synthetic jewels comprises in combination means for passing through a primary duct a stream of gas carrying the constituent material of the jewels in powder form, a distributor for splitting up the stream of gas issuing from the primary duct so that it passes through two or more secondary ducts leading into a furnace chamber, the openings of the secondary ducts into the furnace chamber being arranged in radially symmetrical fashion and the mean rates of flow of the gas and the powder through the secondary ducts being substantially the same for all the secondary ducts, means for fusing the constituent material issuing from the secondary ducts in the furnace chamber by a combustion process involving the gas issuing from the secondary ducts, a support member on which can be built up by progressive crystallisation of the molten constituent material issuing from the secondary ducts a number (equal to the number of secondary ducts) of jewels in the form of rods which extend substantially vertically, the support member being rotatable about a vertical axis which is substantially equidistant from the openings of all the secondary ducts into the furnace chamber, means for accurately locating the support member in each of a number (equal to the number of secondary ducts) of rotary positions which are spaced apart by equal angular intervals, and means for causing relative vertical movement between the support member and the openings of the secondary ducts into the furnace chamber as the rods are built up so as to maintain a substantially constant distance between the tips of the rods and the openings of the secondary ducts into the furnace chamber.

Preferably means are also provided for intermittently rotating the support member about said vertical axis from one of said rotary positions to another in such a manner that the support member occupies each of said rotary positions for equal periods of time.

The distributor may comprise a first passage of annular cross-section disposed around the primary duct and a second passage of annular cross-section disposed around the first passage, the gas being arranged to flow from the primary duct through the first and second passages respectively to the secondary ducts so that the direction of flow of the gas is reversed as it passes from the primary duct to the first passage and as it passes from the first passage to the second passage.

One arrangement in accordance with the present invention will now be described, by way of example, with reference to the accompanying drawings, in which.

Figure 1:
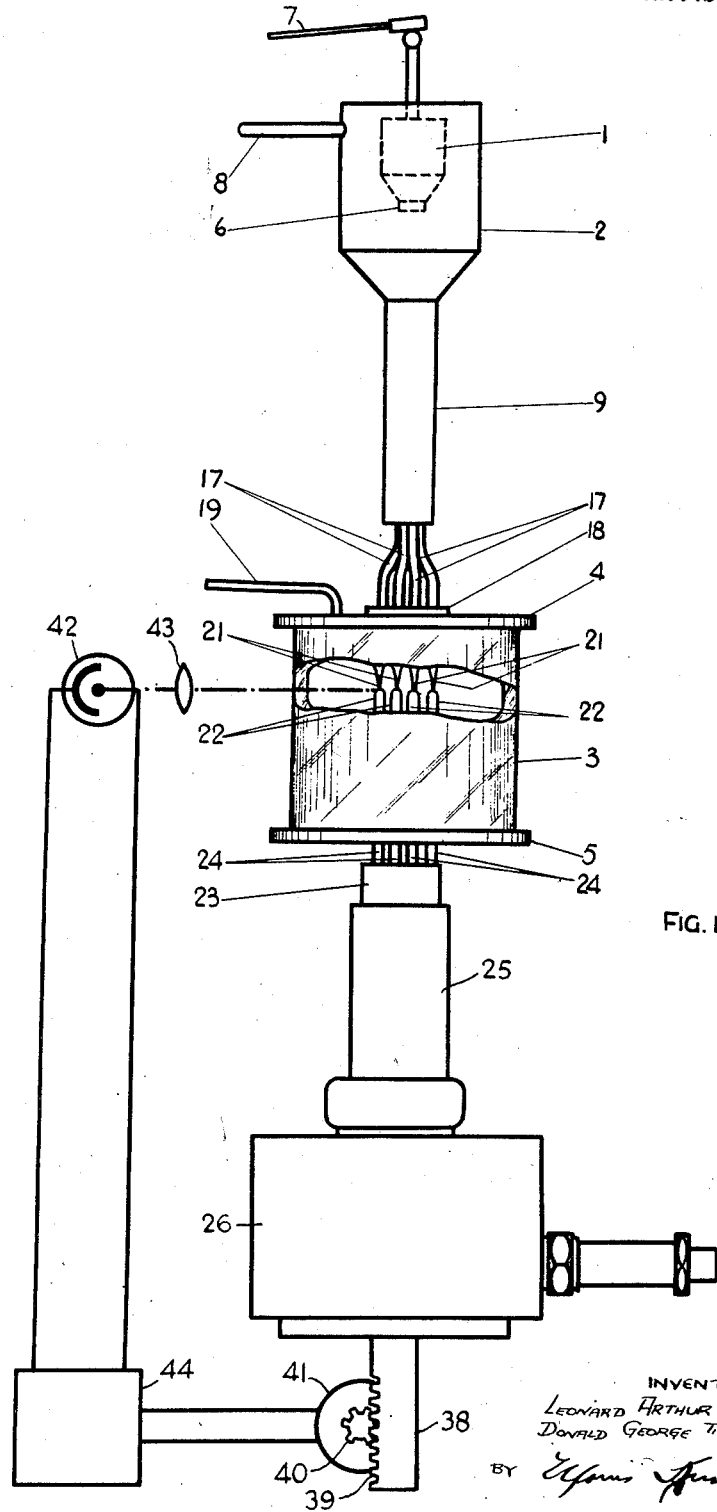
Figure 1 is a diagrammatic view of apparatus for manufacturing simultaneously six rods of synthetic corundum.

Referring to Figure 1 of the drawings, the raw material for the manufacture is in the form of alumina powder and is disposed in a container 1 in a powder dispenser 2 mounted above a furnace chamber which is formed by a hollow glass cylinder 3 mounted between two metal plates 4 and 5. The container 1 is provided at the bottom with a fine sieve 6 and a hammer mechanism 7 is provided for intermittently striking the container 1 so that powder is released. An oxygen supply is connected via a pipe 8 to the interior of the dispenser 2 and the powder released from the container 1 is carried by the oxygen flow into a primary duct extending downwards in the interior of a tubular member 9 disposed between the dispenser 2 and the furnace chamber. The oxygen and alumina powder pass from the primary duct into a distributor, disposed inside the tubular member 9, which splits up the flow into six secondary ducts which lead into the top of the furnace chamber.

Figure 2:
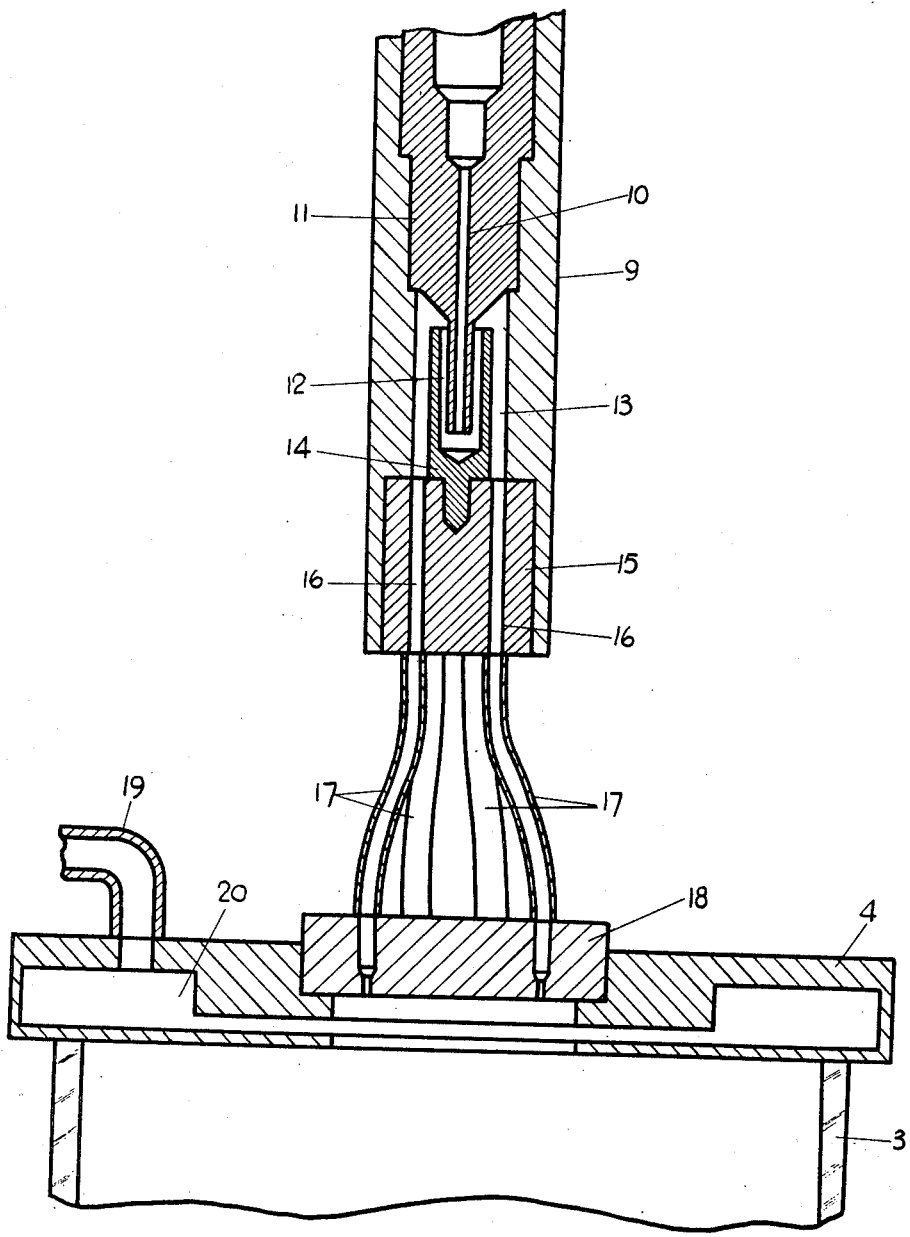
Figure 2 is a sectional view of the distributor and the top of the furnace chamber forming part of the apparatus shown in Figure 1.

The distributor is shown in detail in Figure 2, to which reference should now be made. The primary duct 10 extends axially through a cylindrical member 11 which is mounted inside the tubular member 9. The distributor includes a first passage 12 of annular cross-section surrounding the primary duct 10, and a second passage 13 of annular cross-section surrounding the first passage 12. The passage 12 is formed by two cylindrical surfaces, the inner one of which is formed on the end of the member 11 and the outer one of which is formed inside a cylindrical member 14 which is supported by a cylindrical member 15 mounted inside the tubular member 9. The passage 13 is formed by the outer surface of the member 14 and the inner surface of the member 9. The six secondary ducts 16 lead off from the end of the second passage 13, and it will be seen that the oxygen and alumina powder flow from the primary duct 10 through the passages 12 and 13 respectively to the secondary ducts 16, the direction of flow being reversed as the oxygen and alumina powder pass from the primary duct 10 to the passage 12 and as they pass from the passage 12 to the passage 13.

The six secondary ducts 16 are arranged in radially symmetrical fashion and pass through the member 15, through tubes 17, and through a cylindrical member 18 mounted on the top plate 4 of the furnace chamber, the secondary ducts 16 directing the flow of oxygen and alumina powder vertically downwards as they enter the furnace chamber. A separate hydrogen supply is connected to the furnace chamber via a pipe 19, the hydrogen being arranged to flow into the furnace chamber through a toroidal cavity 20 in the plate 4.

Combustion is caused to take place in the furnace chamber, six flames 21 being formed at the openings of the secondary ducts 16 into the chamber. The alumina powder issuing from the secondary ducts 16 is thus fused, and the molten material is arranged to be built up by progressive crystallisation into six vertically extending rods 22 of synthetic corundum. For this purpose there is provided a support member 23 which includes six ceramic rods 24 which extend vertically through an aperture in the base plate 5 of the furnace chamber. The six rods 24 are arranged in radially symmetrical fashion, one of the six rods 22 of synthetic corundum being built up on the top of each of the six ceramic rods 24. The support member 23 is mounted in a tubular member 25 which is rotatable about a vertical axis which is equidistant from the openings of all the six secondary ducts 16 into the furnace chamber, and an indexing mechanism disposed in a casing 26 is provided for rotating the tubular member 25, and thereby the support member 23, through an angle of 60° about this vertical axis once every half minute. The arrangement is made such that after each rotation the support member 23 is accurately located in one of six rotary positions in each of which the rods 24 are respectively disposed vertically below the openings of the secondary ducts 16 into the furnace chamber, each of the rods 24 being disposed under a different one of these openings in the six respective rotary positions.

Figures 3, 4:
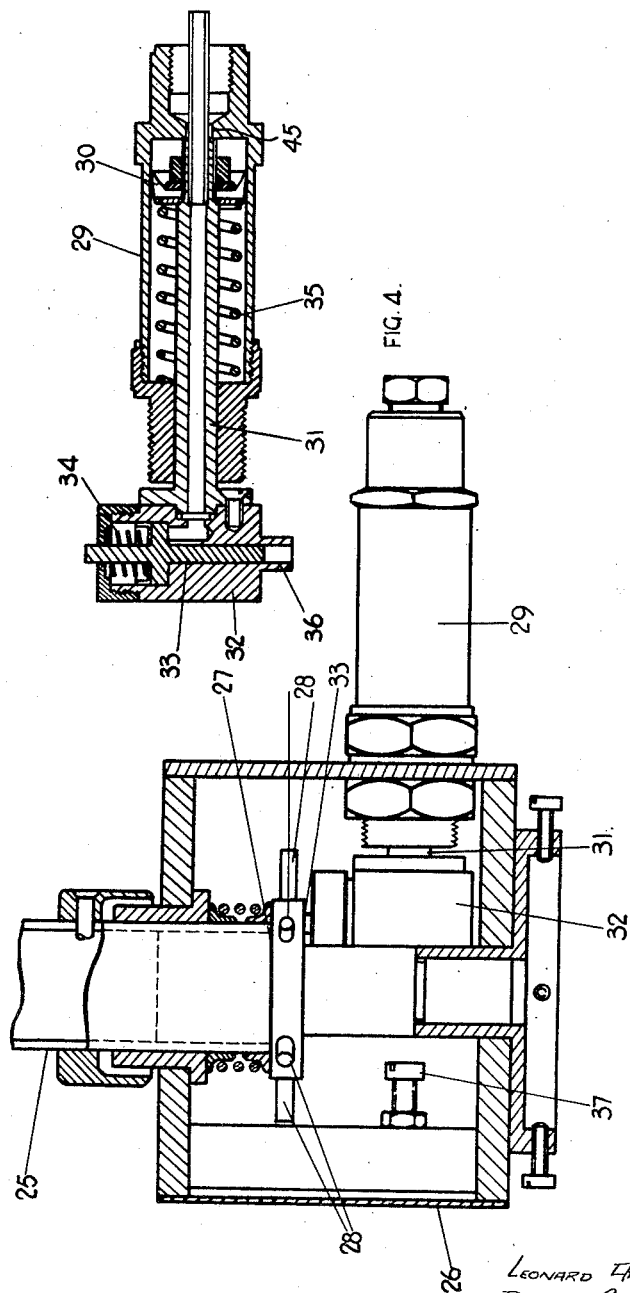
Figure 3 is a sectional view of the indexing mechanism forming part of the apparatus shown in Figure 1.
Figure 4 is a sectional view of part of the indexing mechanism shown in Figure 3.

The indexing mechanism is shown in detail in Figures 3 and 4, to which reference should now be made. The tubular member 25 is secured to a wheel 27 which is provided with six spokes 28 arranged in radially symmetrical fashion. The indexing mechanism includes a cylinder 29 inside which is arranged to slide a piston 30 coupled to a hollow piston rod 31. Mounted on the piston rod 31 is a block 32 in which is mounted a flanged pin 33. Rotation of the tubular member 25 is brought about by applying compressed air to the interior of the cylinder 29 through a channel 45 and to the interior of the piston rod 31. The compressed air applied to the interior of the piston rod 31 raises the pin 33 against the pressure of a spiral spring 34, while the compressed air applied to the interior of the cylinder 29 causes horizontal movement of the piston 30 against the pressure of a spiral spring 35. These movements cause the pin 33 to engage with one of the spokes 28 and thereby rotate the wheel 27 and the tubular member 25, the block 32 being guided in its motion by means of a projection 36 which engages in a slot (not shown) in the base plate of the casing 26. The horizontal motion of the block 32 is limited by means of a stop 37 which is disposed so that when it halts the horizontal motion of the block 32 the support member 23 is accurately located in one of the six rotary positions referred to above. The compressed air supply is then cut off, and the piston 30 returns to its normal position under the influence of the spring 35, the pin 33 being returned to its normal position by the spring 34 so that it does not foul the spokes 28.

It will be seen that the arrangement is such that the support member 23 occupies each of the six rotary positions for equal periods of time. Thus the six rods 22 of synthetic corundum are each built up in equal proportions from the alumina powder issuing from the six secondary ducts 16, and it is found that this arrangement ensures greater uniformity of the resultant product.

In addition, in order to ensure uniformity of the cross-section and quality of the rods 22 of syntheic corundum it is necessary to move them vertically downwards as they are built up so as to maintain a substantially constant distance between the tips of the rods 22 and the openings of the secondary ducts 16 into the furnace chamber. For this purpose the assembly comprising the support member 23, the tubular member 25 and the indexing mechanism is mounted on a vertically extending rod 38 which is provided with a rack of teeth 39 cooperating with a pinion wheel 40 which is arranged to be driven by means of an electric motor 41. The motor 41 is controlled by means of a photo-electric control apparatus such as is described in British patent specification No. 633,118, this apparatus including a photo-electric cell 42 on to which light from the incandescent tip of one of the rods 22 of synthetic corundum is focussed by means of a lens 43. The output of the photo-electric cell 42 is fed to an amplifier and relay circuit 44 which controls the operation of the motor 41 in such a manner that the support member 23 is moved vertically downwards at the required rate. It will be appreciated that the photo-electric control apparatus is responsive at any time to the growth of only that one of the rods 22 which is at that time in a predetermined one of the six positions in which each of the rods 22 may be disposed, but the use of the distributor described above and the regular rotation of the support member 23 ensure that all the six rods 22 will be built up uniformly.

It will be appreciated that while the support member 23 is rotated automatically in the arrangement described above, it could instead be rotated manually, although this would in general be less convenient.

We claim:

1. Apparatus for manufacturing synthetic jewels, comprising members defining a furnace chamber, a primary duct, and at least two secondary ducts leading vertically into the furnace chamber, the openings of the secondary ducts into the furnace chamber being arranged in radially symmetrical fashion, means for passing through the primary duct a stream of a first gas carrying the constituent material of the jewels in powder form, a distributor for splitting up the stream of gas issuing from the primary duct so that it passes through the secondary ducts with the mean rates of flow of the gas and the powder through the secondary ducts being substantially the same for all the secondary ducts, means for introducing into the furnace chamber a flow of a second gas adapted to undergo combustion with said first gas to bring about fusion of the constituent material issuing from the secondary ducts into the furnace chamber, the openings of the secondary ducts into the furnace chamber being spaced apart sufficiently to ensure that during combustion entirely separate flames are formed at each of said openings, a support member on which can be built up by progressive crystallisation of the molten constituent material a number (equal to the number of secondary ducts) of jewels in the form of rods which extend substantially vertically, means for mounting the support member for rotation about a vertical axis which is substantially equidistant from the openings of all the secondary ducts into the furnace chamber, means for accurately locating the support member in each of a number (equal to the number of secondary ducts) of rotary positions which are spaced apart by equal angular intervals, and means for causing relative vertical movement between the support member and the openings of the secondary ducts into the furnace chamber as the rods are built up so as to maintain a substantially constant distance between the tips of the rods and the openings of the secondary ducts into the furnace chamber.

2. Apparatus according to claim 1, including means for intermittently rotating the support member about said vertical axis from one of said rotary positions to another at regular intervals and in a regular sequence of rotary positions.

3. Apparatus according to claim 1, in which the distributor comprises members defining a first passage of annular cross-section disposed around the primary duct and a second passage of annular cross-section disposed around the first passage and communicating with the secondary ducts, said members being shaped to guide the flow of gas from the primary duct into the first passage with reversal of the direction of flow of the gas, and to guide the flow of gas from the first passage into the second passage with reversal of the direction of flow of the gas.

References Cited in the file of this patent

UNITED STATES PATENTS

| Number | Name | Date |
| --- | --- | --- |
| 1,960,215 | Ellis et al. | May 22, 1934 |
| 2,011,872 | Rava | Aug. 20, 1935 |
| 2,591,561 | Lester et al. | Apr. 1, 1952 |

FOREIGN PATENTS

| Number | Country | Date |
| --- | --- | --- |
| 633,118 | Great Britain | Dec. 12, 1949 |